United States Patent
Beguet et al.

(10) Patent No.: US 7,580,257 B2
(45) Date of Patent: Aug. 25, 2009

(54) APPARATUS COMPRISING A PORTABLE ELECTRONIC APPLIANCE AND A DATA INPUT APPLIANCE

(75) Inventors: Bruno Beguet, Vulaine-sur-Seine (FR); Olivier Amberny, Antony (FR); Sébastien Royer De La Bastie, Paris (FR); Eric Carreel, Meudon (FR)

(73) Assignee: Inventel Systemes, Paris (FR)

( * ) Notice: Subject to any disclaimer, the term of this patent is extended or adjusted under 35 U.S.C. 154(b) by 911 days.

(21) Appl. No.: 10/463,566

(22) Filed: Jun. 16, 2003

(65) Prior Publication Data

US 2004/0116164 A1 Jun. 17, 2004

(51) Int. Cl.
*G06F 1/16* (2006.01)
(52) U.S. Cl. .................. 361/686; 361/683
(58) Field of Classification Search ............ 455/403, 455/575.1
See application file for complete search history.

(56) References Cited

U.S. PATENT DOCUMENTS

| 6,108,200 | A * | 8/2000 | Fullerton ............... 361/686 |
| 6,668,159 | B1* | 12/2003 | Olofsson et al. ........ 455/67.11 |
| 2001/0039199 | A1 | 11/2001 | Shinzaki ................ 455/572 |
| 2002/0137542 | A1* | 9/2002 | Masutani et al. ......... 455/556 |
| 2003/0207681 | A1* | 11/2003 | Rowitch ................ 455/404.2 |
| 2003/0210271 | A1* | 11/2003 | King .................... 345/771 |

FOREIGN PATENT DOCUMENTS

| DE | 200 08 761 | 3/2000 | ............ 3/23 |
| DE | 200 19 959 | 11/2000 | ............ 3/2 |
| JP | 2002 169642 | 6/2002 | ............ 3/2 |
| TW | 451576 | 11/1999 | ............ 7/32 |

* cited by examiner

*Primary Examiner*—Creighton Smith
(74) *Attorney, Agent, or Firm*—McCracken & Frank LLP

(57) ABSTRACT

Apparatus comprising a portable electronic appliance and a data input appliance which is adapted to deliver information to the portable electronic appliance via the recharging interface for recharging the batteries of the portable electronic appliance.

4 Claims, 3 Drawing Sheets

APPARATUS COMPRISING A PORTABLE ELECTRONIC APPLIANCE AND A DATA INPUT APPLIANCE

FIELD OF THE INVENTION

The present invention relates to apparatus comprising a portable electronic appliance and a data input appliance which is adapted to deliver information to said portable electronic appliance.

BACKGROUND OF THE INVENTION

Document US-A-6 108 200 describes an example of such apparatus, in which the portable electronic appliance is a digital personal assistance (PDA) provided with a special communications interface suitable for connection to a complementary interface of a keyboard.

Nevertheless, that solution is expensive insofar as it implies providing the portable electronic appliance with an additional communications interface. The extra cost is a drawback whatever the kind of portable electronic appliance under consideration, and it becomes completely unacceptable when the portable electronic appliance is an appliance produced with a very small profit margin, as is the case for radiotelephones for private radiocommunications networks (for example of the digital European cordless telecommunications (DECT) type, of the Bluetooth type, or of some other type).

OBJECTS OF THE INVENTION

A particular object of the present invention is to mitigate those drawbacks.

To this end, according to the invention, apparatus of the kind in question is characterized in that the portable electronic appliance comprises an electronic central unit, a rechargeable electrical battery, a recharging interface adapted to be connected (by electrical contact, by induction, or otherwise) to an external electricity source for recharging the battery, and a detector circuit connected to the central unit and adapted to detect the presence of said source of electricity connected to the recharging interface;

in that the data input appliance comprises an output interface adapted to be connected (by electrical contact, by induction, or otherwise) to the recharging interface of the portable electrical appliance, and a device for generating encoded signals adapted to generate encoded electrical signals representative of information and to apply the encoded electrical signals to the output interface, which encoded electrical signals are received by the recharging interface of the portable electronic appliance when said recharging interface is connected to the output interface of the data input appliance;

in that the detector circuit of the portable electronic appliance is adapted to pick up said encoded electrical signals; and in that the central unit of the portable electronic appliance is adapted to decode the encoded electrical signals picked up by the detection circuit and thereby receive the information represented by said encoded electrical signals.

By means of these dispositions, the portable electronic appliance can be caused to communicate with the data input appliance by making use of the recharger interface which must be present in any event. This communication is thus achieved at very low extra cost in the portable electronic appliance, and at relatively low overall cost, particularly when using a low cost data input appliance such as a keyboard or the like.

In preferred embodiments of the invention, recourse may optionally be had to one or more of the following dispositions:

the portable electronic appliance is a radiotelephone;

the data input appliance has an interface enabling said information to be received from a user, said interface being connected to the device for generating encoded signals;

the interface comprises a keyboard;

the encoded electrical signals generated by the device for generating encoded electrical signals are modulated on two levels, the detector circuit of the portable electronic appliance being adapted to distinguish between said two levels;

the encoded electrical signals generated by the device for generating encoded electrical signals are signals obtained by amplitude modulation of a periodic carrier;

the periodic carrier has a frequency greater than 1000 hertz (Hz)

the data input appliance is electrically powered by the rechargeable battery of the portable electronic appliance via the output interface of said data input appliance when said output interface is connected to the recharging interface of the portable electronic appliance;

the recharging interface of the portable electronic appliance is connected to the rechargeable electric battery via a one-way electronic device allowing electricity to flow in one direction only, enabling the battery to be recharged, said one-way electronic device being connected in parallel with at least one by-pass resistor adapted to enable the battery to power the data input appliance;

the portable electronic appliance includes a screen controlled by the central unit of said portable electronic appliance, the central unit being adapted to cause at least a portion of the information delivered to the portable electronic appliance by the data input appliance to be displayed on the screen;

the data input appliance includes a support enabling the portable electronic appliance to be carried in a position adapted to enable a user using the data input appliance to read the screen of the portable electronic appliance;

the portable electronic appliance includes a keypad and the support of the data input appliance includes at least one wall adapted to mask at least part of the keypad of the portable electronic appliance when said portable electronic appliance is engaged on the support; and the support of the data input appliance includes a housing in which the portable electronic appliance is inserted, said portable electronic appliance being a radiotelephone having a microphone which is inside said housing when the portable electronic appliance is inserted in said housing, said microphone then being in register with an opening arranged in said support and adapted to enable said microphone to receive soundwaves emitted by a user.

BRIEF DESCRIPTION OF THE DRAWINGS

Other characteristics and advantages of the invention appear from the following description of an embodiment of the invention given by way of non-limiting example and with reference to the accompanying drawings.

In the drawings.

In the various figures, the same references are used to designate elements that are identical or similar.

MORE DETAILED DESCRIPTION

Figure 1:
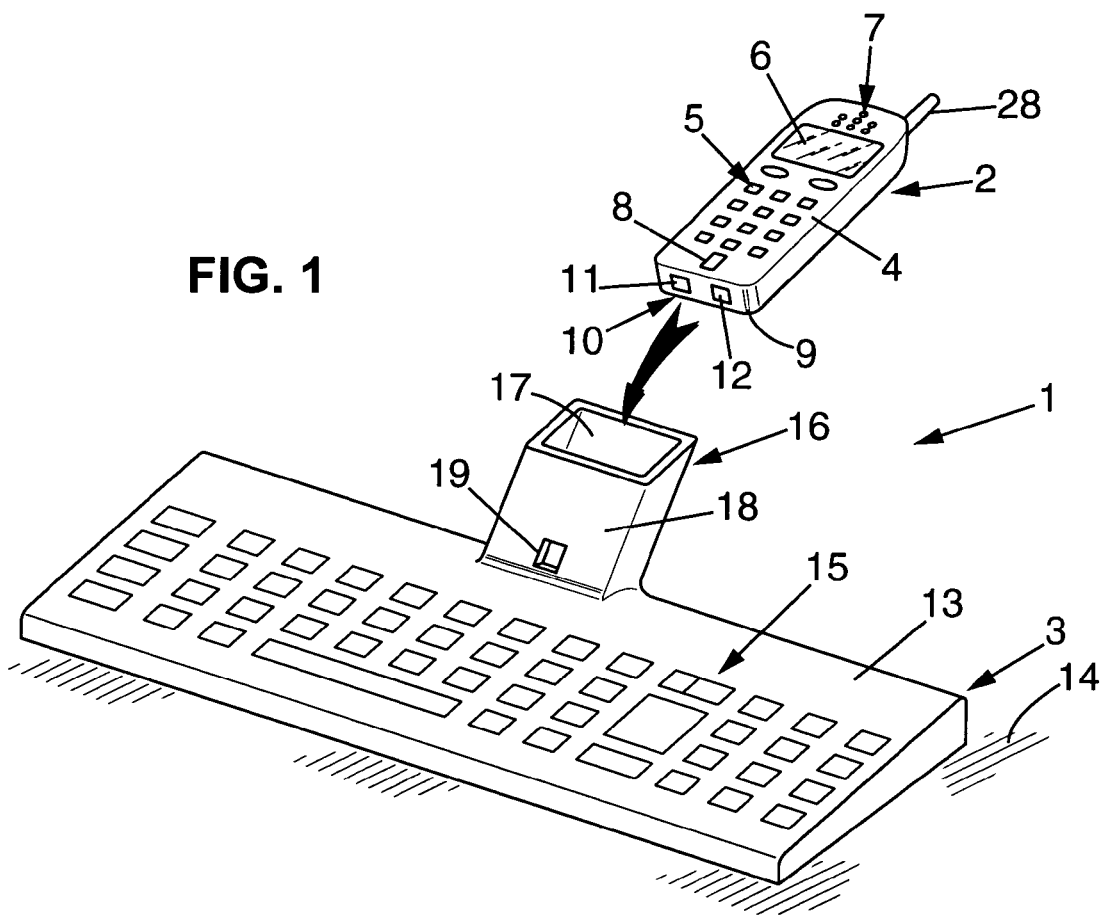
FIGS. 1 and 2 are perspective views of apparatus constituting an embodiment of the invention, comprising a portable radiotelephone and a data input appliance adapted to be connected to the telephone, the radiotelephone being shown separate from the data input appliance of FIG. 1 and connected to said data input appliance in FIG. 2.
Figure 2:
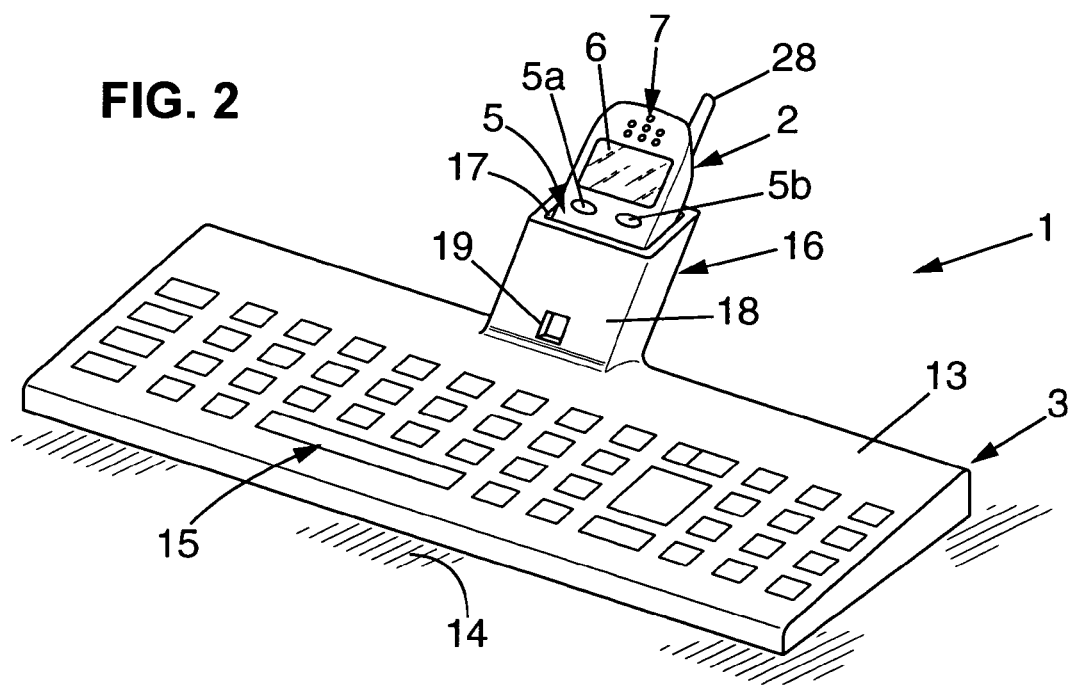

As shown in FIGS. 1 and 2, the invention relates to apparatus 1 comprising firstly a portable electronic appliance 2 and secondly a data input appliance 3 on which the radiotelephone 2 can be connected in order to receive information (e.g. input by a user, or possibly coming from some other apparatus).

In the example shown in the drawings, the portable electronic appliance 2 is constituted by a portable radiotelephone, e.g. one operating in application of a communications protocol for a private radiocommunications network, for example the DECT protocol or the Bluetooth protocol.

Nevertheless, the portable electronic appliance could be constituted by any other appliance, for example a radiotelephone operating in application of a radiocommunications protocol for a public network (e.g. the global system for mobile communications (GSM) protocol, the universal mobile telecommunications system (UMTS) protocol, or some other protocol), a personal digital assistant, etc.

In the example considered here, the portable electronic appliance 2, constituted specifically by a radiotelephone as mentioned above, is in the form of a portable handset suitable for being held in the hand of a user with a front face 4 carrying a keypad 5, a screen 6, a loudspeaker 7, and a microphone 8 disposed towards the bottom end of the handset.

In addition, the bottom face 9 of the handset includes a recharging interface 10 which, in the example shown, has two terminals 11 and 12 enabling the internal battery of the radiotelephone 2 to be recharged when the radiotelephone is engaged on a battery charger stand (not shown) connected to an external power supply, which battery charger stand generally constitutes a fixed radiocommunications base connected to a public communications network and adapted to communicate with the radiotelephone 2 by radio.

Furthermore, in the example shown, the data input appliance 3 is in the form of a board 13 suitable for being placed on a fixed surface 14 such as the top of a table, or the like. On its top face, the board 13 has a man/machine interface 15 adapted to enable a user to input information for delivering to the wireless telephone 2 when it is connected to the data input appliance 3.

In the example shown in FIGS. 1 and 2, the interface 15 is constituted by a keyboard, however the keyboard could be replaced by or associated with some other man/machine interface such as a touch-sensitive screen, a pad for recognizing handwriting, etc.

The data input appliance 3 advantageously forms a support 16 adapted to carry the radiotelephone 2 enabling it to communicate with the data input appliance 3, as explained below. Advantageously, as can be seen in FIG. 2, the support 16 is adapted to carry the radiotelephone 2 in a raised position enabling a user making use of the keyboard 15 to view the screen 6 of the radiotelephone easily: when the user is inputting information via the keyboard 15, at least part of said information can be displayed on the screen 6 of the radiotelephone, thereby enabling the user to check that the information is input properly, and where appropriate to correct it.

Advantageously, the support 16 may be in the form of a raised stand defining an internal housing 17 in the form of a well in which the bottom portion of the radiotelephone can be engaged. When the radiotelephone 2 is engaged in the housing 17, the front wall 18 defining said housing may advantageously cover at least a part of the keypad 5 of the radiotelephone so as to make the keypad unavailable and oblige the user to use the keyboard 15 of the data input appliance 3.

The front wall 18 may optionally leave a few keys 5a, 5b of the keypad 5 available, for example the keys that enable a call to be made or interrupted.

In addition, the front wall 18 of the support 16 may advantageously include an opening 19 arranged to coincide with the position occupied by the microphone 8 of the radiotelephone 2 when said radiotelephone is inserted in the housing 17, thereby enabling said microphone 8 to receive soundwaves emitted by a user. Thus, it is possible to use the radiotelephone 2 on a telephone call while it is being carried by the support 16.

Figure 3:
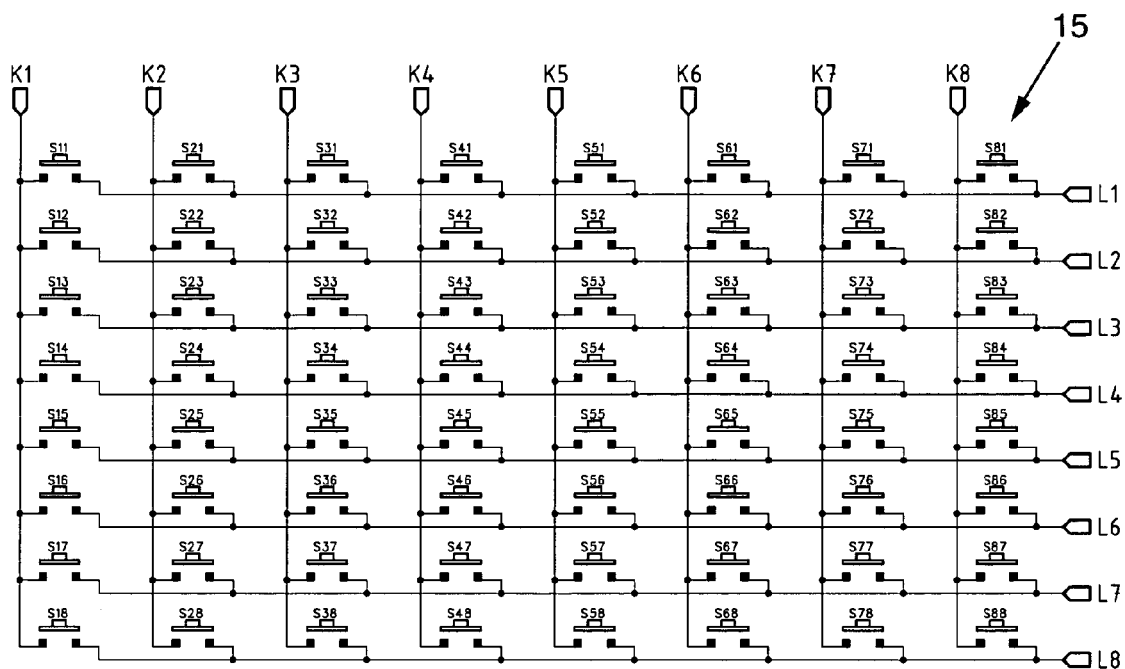
FIG. 3 is a block diagram showing the electronic circuit of the data input appliance of FIGS. 1 and 2.
Figure 3:
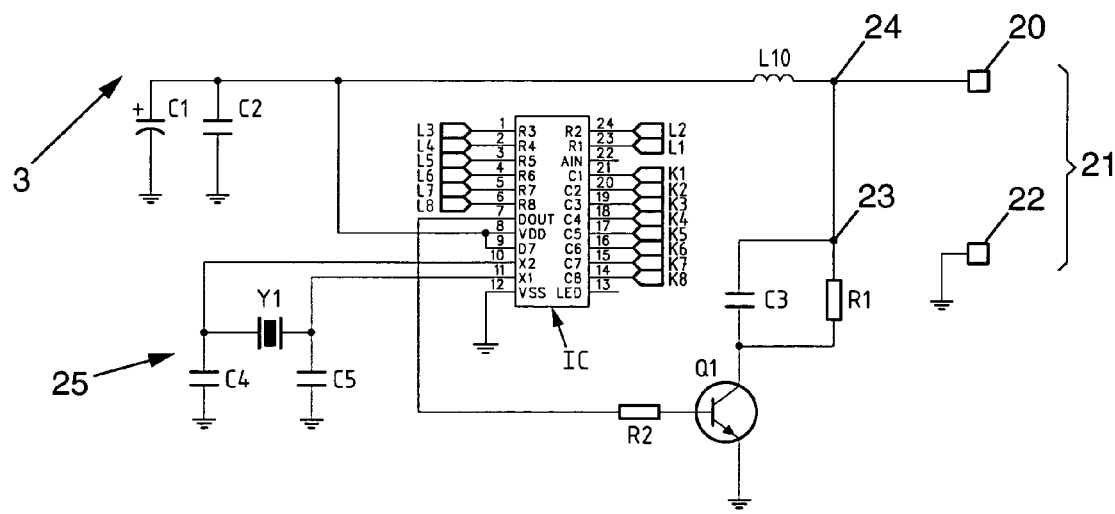

As shown in FIG. 3, the internal electronic circuit of the data input appliance 3 may comprise a microcontroller IC which may be constituted, by way of example, by an encoder circuit sold under the reference HT6222 by the supplier Holtek Semiconductor Inc., 3 Creation Road, II, Science-Based Industrial Park, Hsinchu, Taiwan. Microcontrollers of this type which are also used, for example, for controlling infrared light-emitting diodes (LEDs) in remote control units present the advantage of being particularly low cost.

The microcontroller IC has inputs K1-K8 each connected to a column of keys S11-S18, S21-S28, S31-S38, S41-S48, S51-S58, S61-S68, S71-S78, and S81-S88 belonging to the keyboard 15. In addition, the microcontroller also has inputs L1-L8, connected to respective different rows of keys constituting the keyboard 15, namely S11-S81, S12-S82, S13-S83, S14-S84, S15-S85, S16-S86, S17-S87, and S18-S88.

When a user presses on one of the keys S11-S88, the microcontroller IC can thus identify the column input Ki and the row input Lj which are short-circuited together by said key, and the microcontroller IC then generates on its output DOUT a coded signal representative of the key which has just been actuated.

In the example described herein, this coded signal is superposed on a carrier constituted by a periodic signal such as a squarewave clock signal preferably emitted at a frequency greater than 1 kilohertz (kHz) and advantageously greater than 10 kHz, e.g. at a frequency of 38 kHz.

Each time a key of the keyboard is depressed, the signal emitted by the microcontroller IC may be coded on some number n of bits, e.g. 8 bits. By way of non-limiting example, in the particular case described herein, a bit equal to 0 may be constituted by a high level signal having a duration of 0.56 milliseconds (ms) (in other words, the 38 kHz carrier is allowed to pass for 0.56 ms) followed by no signal during 0.56 ms. Still in this example, a bit equal to 1 may be represented by a high level signal for 0.56 ms (as for a bit equal to 0), but this time followed by a 0 level signal for 1.68 ms.

The output signal DOUT is thus encoded on two levels, by a kind of modulation that is conventional in baseband, known as on/off keying (OOK).

Where appropriate, it should be observed that the signal could be encoded on more than two levels, in particular by associating amplitude modulation and phase modulation.

The output DOUT from the microcontroller IC is connected via a resistor R2 to the base of an NPN transistor Q1 whose emitter is connected to ground and whose collector is connected via a resistor R1 in parallel with a capacitor C3 (e.g. having capacitance of about 1 nanofarard (nF)) to one of the terminals 20 of an output interface 21. In the example described, this output interface 21 comprises two terminals 20, 22 which are disposed in the bottom of the housing 17 and which are adapted to come into contact with the terminals 11, 12 respectively of the recharging interface 10 of the radiotelephone 2 when said radiotelephone is inserted in the well 17.

In the example described, the terminal 20 of the output interface 21 is normally raised to a positive potential of about 2.4 volts (V) by the terminal 11 of the radiotelephone 2 when said radiotelephone is inserted in the housing 17 (as explained below), while the other terminal 22 is connected to ground.

Thus, for each pulse emitted by the output DOUT of the microcontroller IC (at the frequency of 38 kHz), while said output is emitting a high level signal, the transistor Q1 becomes conductive and lowers the potential of the terminal 20 to 0 (at this frequency, the capacitor C3 acts as a short circuit).

In contrast, during periods when the terminal DOUT of the microcontroller is emitting a low level signal, or between two pulses emitted by the output DOUT while it is emitting a high level signal, the transistor Q1 is in its non-conductive state and the terminal 20 remains at its high potential.

Advantageously, the microcontroller IC is electrically powered via the terminal 20 when the radiotelephone 2 is inserted in the housing 17.

For this purpose, the terminal 20 is connected to the power supply input VDD of the microcontroller IC, preferably via a choke L10, e.g. having inductance of about 100 microhenries (μH), which choke L10 preferably branches from a node 24 situated between the terminal 20 and a node 23 connected both to the resistor R1 and to the capacitor C3. The choke L10 serves to filter out the coded signals constituted by the succession of high and low level potentials at the terminal 20 so that these variations in potential have no significant influence on the power supply input VDD of the microcontroller.

In addition, one or more capacitors C1, C2 may advantageously be connected between the power supply input VDD of the microcontroller and ground in order to constitute a reserve of electrical energy. In the example described herein, there are two such capacitors, having respective capacitances of about 1000 microfarads (μF) and 100 nF, for example.

An oscillator circuit 25 (e.g. comprising two capacitors C4, C5 and a ceramic resonator Y1) may also be connected to two inputs X1, X2 of the microcontroller IC in order to generate a periodic signal serving to generate the carrier at 38 kHz.

Figure 4:
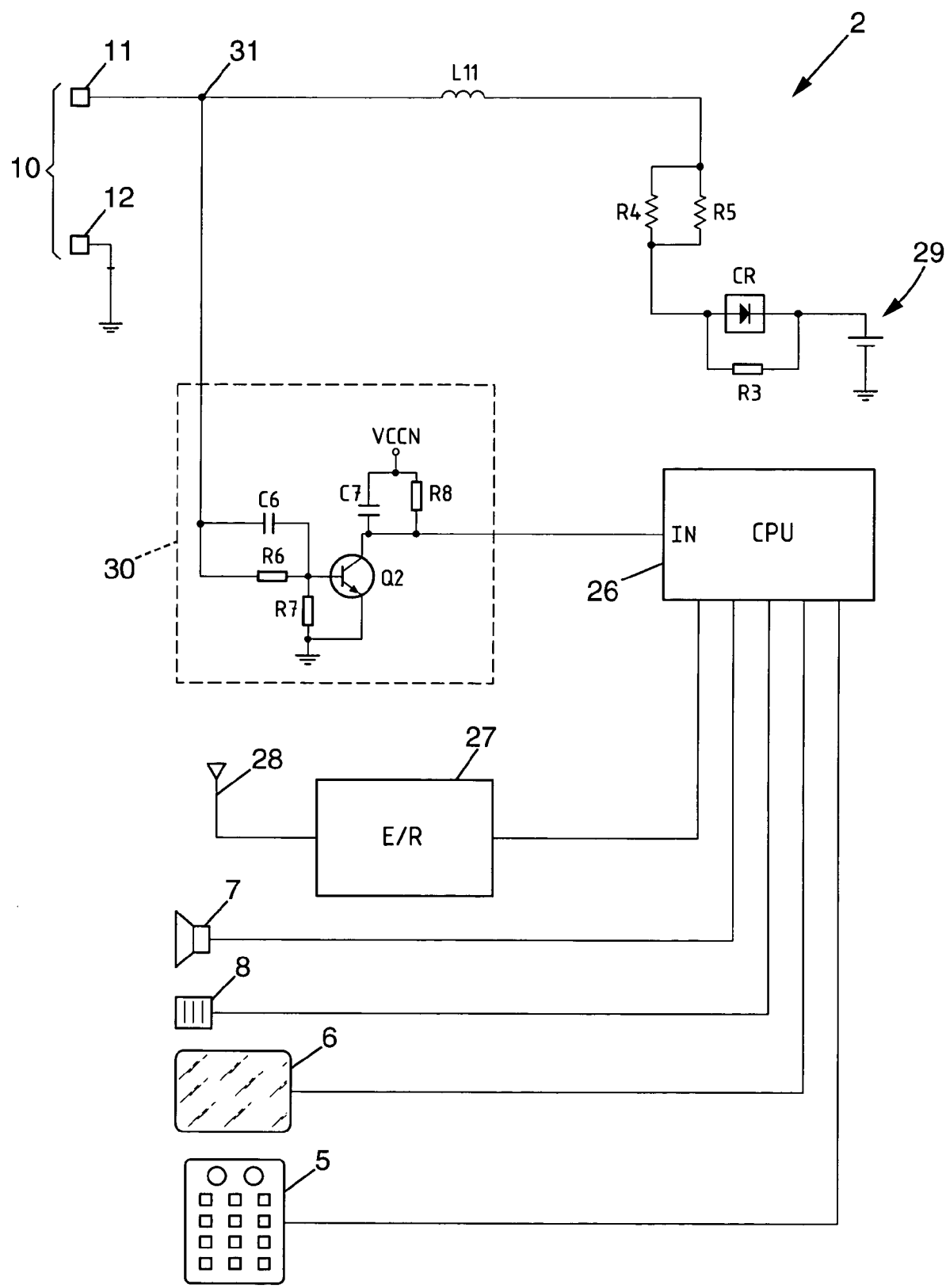
FIG. 4 is a block diagram showing a portion of the electronic circuit of the radiotelephone of FIGS. 1 and 2.

Furthermore, as shown in FIG. 4, the radiotelephone 2 may include an electronic central unit 26 (CPU) such as a microcontroller, connected:

to a radio transceiver circuit 27 (I/O) itself connected to one or more antennas 28;
to the keypad 5;
to the screen 6;
to the loudspeaker 7; and
to the microphone 8.

Although, for reasons of simplicity, FIG. 4 shows respective direct connections between the central unit 26 and the keypad 5, the screen 6, the loudspeaker 7, and the microphone 8, respectively, it should be observed that these various elements are generally connected to the central unit 26 via interface circuits which may, where appropriate, be integrated in the central unit 26 or else in some of said elements.

The radiotelephone unit 2 is powered by a rechargeable battery 29, e.g. delivering a voltage of about 2.4 V (the power supply connections between the battery and the various elements of the radiotelephone are not shown in FIG. 4, for reasons of clarity).

The positive terminal of the rechargeable battery 29 is connected to the terminal 11 of the recharging interface via resistors R4 and R5 which are connected in series with a diode CR or with any other one-way electronic device allowing electricity to flow in one direction only so as to enable the battery 26 to be recharged.

Advantageously, a choke L11 e.g. having inductance of about 100 μH is interposed between the terminal 11 of the recharger interface 10 and the resistors R4, R5 so as to filter out the electrical pulses that might be generated on the terminal 11 (electrostatic pulses and/or pulses due to the coded signal generated by the output interface 21 of the data input appliance).

A by-pass resistor R3, e.g. having resistance of about 1 kiloohm (kΩ) is advantageously connected in parallel with the diode CR so as to allow by-pass current to flow from the positive terminal of the battery 29 to the terminal 20 of the output interface of the data input appliance 3 when the terminal 11 of the radiotelephone 2 is connected to said terminal 20: this by-pass resistor R4 thus enables the electronic circuit of the data input appliance 3 to be powered, as mentioned above, at a voltage of about 2.4 V in the example described.

Furthermore, the radiotelephone 2 has a detector circuit 30 whose input is connected to a node 31 situated between the terminal 11 and the choke L11 and whose output is connected to a logic input IN of the central unit 26.

By way of example, the detector circuit 30 may comprise an NPN transistor Q2 whose base is connected to the above-mentioned node 31 via a resistor R6, whose emitter is connected to ground, and whose collector is connected to a voltage source VCCN via a resistor R8. The voltage source VCCN may be provided, for example, by the power supply circuit of the mobile telephone 2 (not shown), this voltage source being at a potential of 3 V, for example.

In the particular example described herein, the above-mentioned resistors R6, R7, and R8 may have respective resistances of about 100 kΩ, 10 kΩ, and 100 kΩ. In addition, capacitors C6 and C7 may advantageously be connected in parallel respectively with the resistors R6 and R7 so as to act as highpass filters. In the example described herein, the capacitors C6 and C7 may have respective capacitances of about 100 nF and 1 nF.

These dispositions serve in conventional manner to detect the presence of an external source of electricity connected to the terminals 11, 12 of the power supply interface 10, which external source of electricity may advantageously be provided by a fixed radiocommunications base (not shown). By way of example, this external source may deliver a voltage of about 6 V, so the resistors R6 and R7 may have resistances designed to enable the transistor Q2 to become conductive when the terminal 11 is at a direct current (DC) potential greater than 4 V: under such circumstances, the input IN of the central unit is continuously at 0, thus making it possible to detect the presence of an external electricity source.

In contrast, when the radiotelephone 2 is connected to nothing, or when it is connected to the data input appliance 3 and the output DOUT of the microcontroller IC is delivering a low signal, the terminal 11 of the radiotelephone is at a DC or pseudo-DC voltage of about 2.4 V, which, given the resistances of the resistors R6 and R7, leads to a very low voltage being applied to the base of the transistor Q2, a voltage that is not sufficient for causing it to switch to the conductive state.

Furthermore, when the output DOUT of the microcontroller IC of the data input appliance 3 generates a high signal corresponding to a succession of pulses at the frequency of 38 kHz, the high signal gives rise to alternating zero voltages and voltages of about 2.4 V at the terminals 20 and 11, as explained above. These alternating voltages at the frequency of 38 kHz are not influenced by the presence of the battery 29 and nor do they influence the battery because the choke L11 acts substantially as an open-circuit switch at this frequency.

In addition, each time the alternating signal passes through a high value (about 2.4 V in the example described), this voltage is transmitted to the base of the transistor Q2 via the capacitor C6 which acts substantially as a short circuit at said frequency, such that the transistor Q2 is then conductive. In contrast, when the alternating signal passes to a substantially zero value, the transistor Q2 is non-conductive.

When the output DOUT of the microcontroller IC emits a high signal, this leads to an alternation of conductive and non-conductive states of the transistor Q2 at the frequency of 38 kHz.

Because of the presence of the capacitor C7 which filters the signal, the input IN of the central unit 26 then finds itself at a zero potential throughout the duration of the high signal in question, thus enabling such a high signal to be identified.

Thus, all of the signals emitted by the microcontroller IC of the data input appliance can be recognized by the central unit 26 of the radiotelephone.

The central unit 26 also has in a memory (in an internal memory, or where appropriate in an external memory, not shown), a correspondence table between the binary codes emitted by the microcontroller IC and the keys S11-S88 corresponding to said code, thereby enabling the central unit to reconstitute the information input by the user via the keyboard 15 of the data input appliance 3. The information as communicated in this way to the central unit 26 is advantageously displayed at least in part on the screen 6, as explained above.

By way of example, the information in question may enable a user to type alphanumeric messages easily for subsequent transmission by the radiotelephone 2. Alphanumeric messages of this type are provided for in most radiocommunications protocols, including the above-mentioned DECT protocol (see for example document WO-A-97/10684 or document EP-A-0 895 433).

It should also be observed that the information input by the user by means of the data input appliance 3 could also consist in information for storing in a telephone directory or, where appropriate, in a directory contained in a memory of the radiotelephone 2 (as mentioned above, said memory may either be internal to the central unit 26, or may be constituted by an external memory connected to said central unit 26).

It should also be observed that the data input appliance could also constitute the fixed radiocommunications base which communicates with the radiotelephone 2, when it is constituted by a radiotelephone operating under a private radiocommunications protocol.

Finally, it should be observed that instead of powering the data input appliance 3 from the rechargeable battery 29 of the radiotelephone, the data input appliance 3 could be connected to a mains supply and serve to power the radiotelephone in order to recharge its battery.

The invention claimed is:

1. Apparatus comprising an electronic portable appliance and a data input appliance adapted to deliver information to said portable electronic appliance,
    wherein the portable electronic appliance comprises an electronic central unit, a rechargeable electrical battery, a recharging interface adapted to be connected to an external electricity source for recharging the battery, and a detector circuit connected to the central unit and adapted to detect the presence of said source of electricity connected to the recharging interface;
    wherein the data input appliance comprises an output interface adapted to be connected to the recharging interface of the portable electrical appliance, and a device for generating encoded signals adapted to generate encoded electrical signals representative of information and to apply the encoded electrical signals to the output interface, which encoded electrical signals are received by the recharging interface of the portable electronic appliance when said recharging interface is connected to the output interface of the data input appliance;
    wherein the detector circuit of the portable electronic appliance is adapted to pick up said encoded electrical signals;
    wherein the central unit of the portable electronic appliance is adapted to decode the encoded electrical signals picked up by the detection circuit and thereby receive the information represented by said encoded electrical signals;
    wherein the portable electronic appliance includes a screen controlled by the central unit of said portable electronic appliance, the central unit being adapted to cause at least a portion of the information delivered to the portable electronic appliance by the data input appliance to be displayed on the screen; and
    wherein the portable electronic appliance includes a keypad and the support of the data input appliance includes at least one wall adapted to mask at least part of the keypad of the portable electronic appliance when said portable electronic appliance is engaged on the support.

2. The system according to claim 1, in which the data input appliance includes a support enabling the portable electronic appliance to be carried in a position adapted to enable a user using the data input appliance to read the screen of the portable electronic appliance.

3. The system according to claim 1, in which the support of the data input appliance includes a housing in which the portable electronic appliance is inserted, said portable electronic appliance being a radiotelephone having a microphone which is inside said housing when the portable electronic appliance is inserted in said housing, said microphone then being in register with an opening arranged in said support and adapted to enable said microphone to receive soundwaves emitted by a user.

4. A data input appliance adapted to deliver information to a portable electronic appliance that comprises an electronic central unit, a rechargeable electrical battery, a recharging interface adapted to be connected to an external electricity source for recharging the battery, a detector circuit connected to the central unit and adapted to detect the presence of said source of electricity connected to the recharging interface and a keypad, the data input appliance comprising;
    an output interface adapted to be connected to the recharging interface of the portable electrical appliance, and a device for generating encoded signals adapted to generate encoded electrical signals representative of information and to apply the encoded electrical signals to the output interface, which encoded electrical signals are received by the recharging interface of the portable electronic appliance when said recharging interface is connected to the output interface of the data input appliance;
    wherein the support of the data input appliance includes at least one wall adapted to mask at least part of the keypad of the portable electronic appliance when said portable electronic appliance is engaged on the support;
    wherein the detector circuit of the portable electronic appliance is adapted to pick up said encoded electrical signals;
    wherein the central unit of the portable electronic appliance is adapted to decode the encoded electrical signals picked up by the detection circuit and thereby receive the information represented by said encoded electrical signals; and
    wherein the portable electronic appliance includes a screen controlled by the central unit of said portable electronic appliance, the central unit being adapted to cause at least a portion of the information delivered to the portable electronic appliance by the data input appliance to be displayed on the screen.

* * * * *

UNITED STATES PATENT AND TRADEMARK OFFICE
CERTIFICATE OF CORRECTION

PATENT NO. : 7,580,257 B2 Page 1 of 1
APPLICATION NO. : 10/463566
DATED : August 25, 2009
INVENTOR(S) : Beguet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1358 days.

Signed and Sealed this

Fourteenth Day of September, 2010

David J. Kappos
*Director of the United States Patent and Trademark Office*